(12) United States Patent
Tateishi et al.

(10) Patent No.: US 10,030,969 B2
(45) Date of Patent: Jul. 24, 2018

(54) ROAD CURVATURE DETECTION DEVICE

(71) Applicant: DENSO CORPORATION, Kariya, Aichi-pref. (JP)

(72) Inventors: Kojiro Tateishi, Nishio (JP); Naoki Kawasaki, Nishio (JP); Shunsuke Suzuki, Kariya (JP); Hiroshi Mizuno, Kariya (JP); Takeshi Shikimachi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/386,652

(22) Filed: Dec. 21, 2016

(65) Prior Publication Data
US 2017/0184396 A1    Jun. 29, 2017

(30) Foreign Application Priority Data

Dec. 25, 2015 (JP) .................................. 2015-253312

(51) Int. Cl.
*G01B 11/24* (2006.01)
*G01C 21/26* (2006.01)
*G01C 25/00* (2006.01)

(52) U.S. Cl.
CPC .............. *G01B 11/24* (2013.01); *G01C 21/26* (2013.01); *G01C 25/00* (2013.01)

(58) Field of Classification Search
None
See application file for complete search history.

(56) References Cited

U.S. PATENT DOCUMENTS

2016/0232412 A1* 8/2016 Nishijima .......... G06K 9/00791

FOREIGN PATENT DOCUMENTS

JP        2005-300294 A     10/2005

* cited by examiner

*Primary Examiner* — Jonathan M Dager
*Assistant Examiner* — Garrett F Evans
(74) *Attorney, Agent, or Firm* — Knobbe, Martens, Olson & Bear, LLP (57) ABSTRACT

An in-vehicle system as a road curvature detection device calculates a curvature of a road in front of a vehicle based on an acquired front scene image. The in-vehicle system receives gradient information from the data map. The gradient information corresponds to a current road section on the road on which the vehicle drives. The in-vehicle system detects a gradient accuracy of the received gradient information. When the current road section has a gradient, i.e. the road is an uphill or downhill road, the in-vehicle system selects an appropriate special detection methods based on the gradient accuracy of the received gradient information, and calculates a road curvature by using the selected special detection method. Each of the special detection methods calculates a road curvature while effectively suppressing influence of a road gradient indicated by the received gradient information.

10 Claims, 5 Drawing Sheets

ROAD CURVATURE DETECTION DEVICE

CROSS-REFERENCE TO RELATED APPLICATION

This application is related to and claims priority from Japanese Patent Application No. 2015-253312 filed on Dec. 25, 2015, the contents of which are hereby incorporated by reference.

BACKGROUND OF THE INVENTION

1. Field of the Invention

The present invention relates to technologies for detecting a curvature of a road on which vehicles travels.

2. Description of the Related Art

For example, patent document 1, Japanese laid open publication No. 2005-300294 discloses a device and method of detecting a gradient of a road (or a slope of a road), on which a vehicle travels, on the basis of a front scene image of the road in front of the vehicle captured by an in-vehicle monocular camera. The device disclosed in the patent document 1 detects a shape of a lane boundary line on the road on the basis of edge points which have been extracted from the captured front scene image, and detects a gradient of the road on the basis of the detected shape of the lane boundary line.

There is known another conventional device to detect a curvature of the road on the basis of the front scene image of the road captured by the in-vehicle monocular camera. This conventional device detects a shape of a lane boundary line on the basis of edge points extracted from the captured front scene image, and detect the curvature of the road on the basis of the detected shape of the lane boundary line.

However, the shape of the lane boundary line often varies in the captured front scene image due to a gradient of the road. Accordingly, there is a possible difficulty for the conventional device to correctly detect whether the shape variation of the lane boundary line is due to the shape variation of the lane boundary line or the curvature variation of the road. This case reduces the detection accuracy of calculating a correct curvature of the road.

SUMMARY

It is therefore desired to provide a road curvature detection device capable of detecting a curvature of a road, on which an own vehicle travels, with high accuracy.

An exemplary embodiment provides a road curvature detection device to be mounted on an own vehicle. The road curvature detection device has a computer system including a central processing unit. The computer system is configured to provide an image acquiring section, an estimation section, an information acquiring section, an accuracy detection section, a gradient judgment section, and a calculation section.

The image acquiring section acquires a front scene image of a front road in front of the own vehicle. The estimation section estimates a position of the own vehicle on the basis of map data. The information acquiring section acquires gradient information of a current road section in the front road including a current position of the own vehicle from the map data. The gradient information includes a magnitude of a gradient and direction of the current road section. The front road extends from the position of the own vehicle in a forward direction of the own vehicle. The accuracy detection section detects a gradient accuracy of the gradient information. The gradient judgment section detects whether or not a magnitude of the gradient indicated by the gradient information is not less than a predetermined gradient threshold value. The calculation section extracts edge points from the front image corresponding to the front scene image when the color of each of the extracted edge points is different from the color of the surrounding area by more than a predetermined threshold. The calculation section calculates a curvature of the front road on the basis of the extracted edge points. The calculation section selects one or more appropriate special detection methods when the gradient judgment section detects that the magnitude of the gradient is not less than the predetermined gradient threshold value. The calculation section executes the selected special detection method so as to calculate the curvature of the front road while suppressing influence of the gradient indicated by the gradient information.

When the current road section of the own vehicle specified on the basis of the map data has a gradient which is not less than the predetermined gradient threshold value, the road curvature detection device selects a method from the special detection methods on the basis of the gradient accuracy of the gradient information obtained from the map data. The road curvature detection device executes the selected special detection method in order to calculate the curvature of the front road while suppressing influence of the gradient indicated by the received gradient information.

However, when the gradient accuracy of the gradient information is low, there is a possible problem in which a curvature calculation error increases when the special detection method is used, more than a calculation error generated without using the special detection method. In particular, when the gradient accuracy of the gradient information is low, and the special detection method having a high suppression function is used, there is a possible case where the road curvature detection device generates a large curvature calculation error.

The road curvature detection device according to the present invention selects a method from the multiple special detection methods on the basis of the gradient accuracy of the received gradient information. That is, the road curvature detection device selects and uses the optimum detection method in the special detection methods according to the gradient accuracy of the received gradient information. For example, when a gradient accuracy of the received gradient information is high, the road curvature detection device selects and uses a special detection method capable of greatly suppressing influence of the gradient indicated by the received gradient information. On the other hand, when the gradient accuracy of the received gradient information is low, the road curvature detection device selects and uses a special detection method capable of slightly suppressing influence of the gradient indicated by the received gradient information. The road curvature detection device can calculate the curvature of the front road of the own vehicle with high accuracy.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a road curvature detection device according to an exemplary embodiment with reference to FIG. 1 to FIG. 5.

Figure 1:
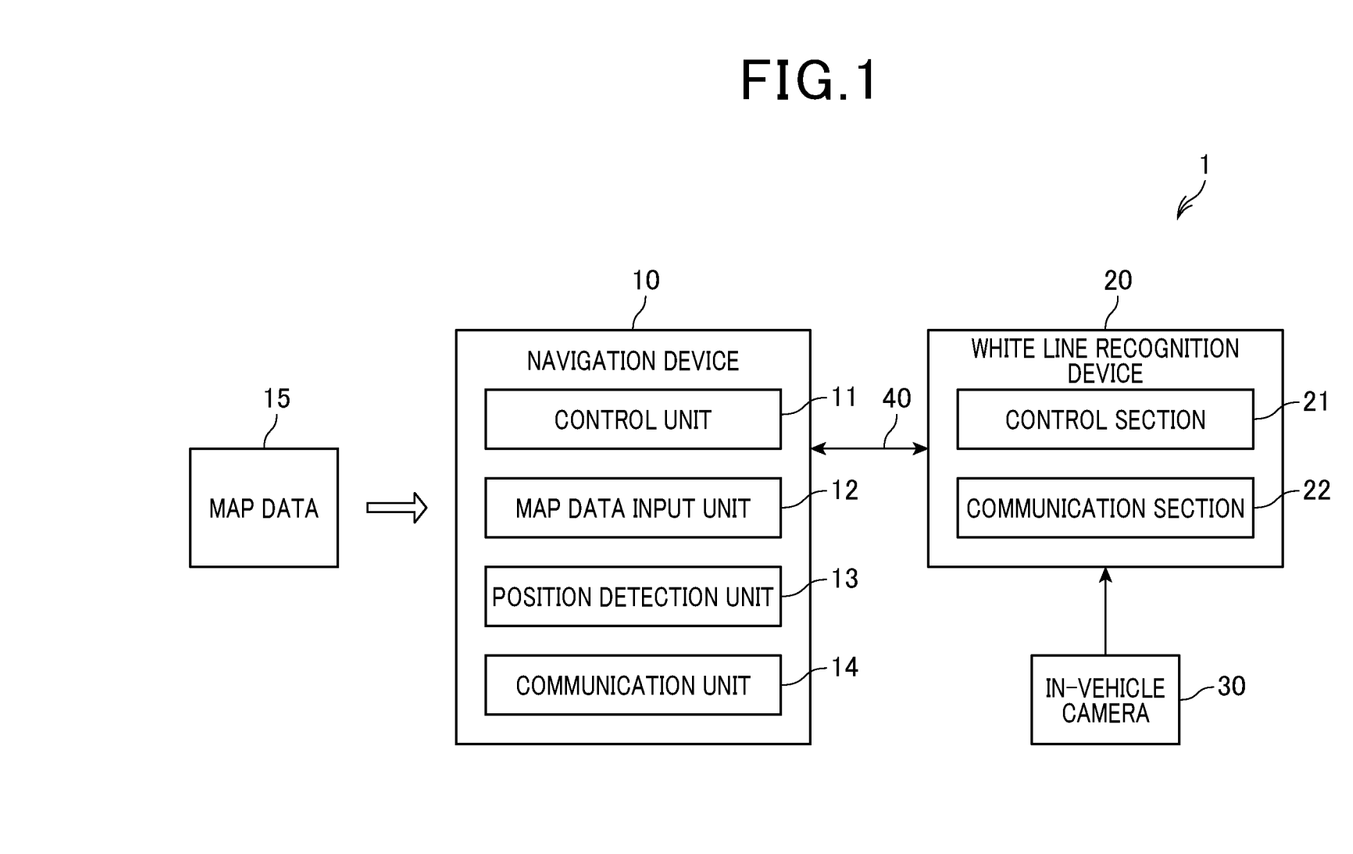
FIG. 1 is a view showing a block diagram of an in-vehicle system 1 as a road curvature detection device according to an exemplary embodiment of the present invention.

FIG. 1 is a view showing a block diagram of the in-vehicle system 1 as the road curvature detection device according to the exemplary embodiment.

As shown in FIG. 1, the in-vehicle system 1 has a navigation device 10, a white line recognition device 20 and an in-vehicle camera 30, etc. The navigation device 10 and the white line recognition device 20 are communicated together through an in-vehicle local area network 40 (in-vehicle LAN 40). The in-vehicle LAN 40 is one of a controller area network (CAN) or a CAN bus. The in-vehicle system 1 is mounted on an own vehicle. For example, it is possible to realize the in-vehicle system 1 by using a computer system including a microcomputer, etc. The in-vehicle system 1 corresponds to the road curvature detection device according to the exemplary embodiment.

The navigation device 10 detects the current position of the own vehicle on the road. Cruise assist uses the current position of the own vehicle. The current position of the own vehicle indicates the position of the own vehicle on the road on which the own vehicle travels. Cruise assist indicates a lane keeping assist, an autonomous driving (a self-driving), etc.

The lane keeping assist supports the driver of the own vehicle to cruise along a traffic lane on the road, and to help the driver steer and keep the own vehicle on course. For example, the lane keeping assist alerts the driver when detecting that the own vehicle is about to deviate from the traffic lane.

The autonomous driving includes a technology for the own vehicle to automatically cruise to a target position. Further, the autonomous driving includes a technology for the own vehicle to automatically drive in a forward direction on the road along a traffic lane. The navigation device 10 has a control unit 11, a map data input unit 12, a vehicle position detection unit 13, a communication unit 14, etc.

The control unit 11 has a microcomputer, etc. The microcomputer is composed of a central processing unit (CPU), a read only memory (ROM), a random access memory (RAM), an input/output interface (I/O interface), etc. The control unit 11 obtains programs stored in the ROM and the RAM, and executes the programs to control the operation of each of the map data input unit 12, the vehicle position detection unit 13, the communication unit 14, etc. in the navigation device 10.

The RAM and the ROM in the control unit 11 correspond to non-transitory memory mediums capable of storing the programs.

The control unit 11 executes the programs stored in the ROM and the RAM so as to realize various functions of cruise assist for the own vehicle. It is acceptable to use logical circuits and analogue circuits to realize the various processes executed by the control unit 11.

The map data input unit 12 receives various types of data such as the map data 15, etc. It is possible to use a DVD-ROM (Digital Versatile Disk-Read Only Memory), a HDD (Hard Disk Drive) as memory storage mediums in order to store the map data 15. The control unit 11 uses the map data 15 and performs cruise assist for the own vehicle on the basis of the map data 15.

The map data 15 contains link information and node information. The link information contains a shape of each road ("road shape" for short). The node information contains position information of each node ("node position information" for short). Each node connects two links. For example, two links are connected through a node. A node is located at each end of a link. For example, it is possible to form a road network when multiple links are connected on the basis of the node position information.

The map data 15 further contains road gradient information. The road gradient information corresponds to each road section stored in the map data 15. In the map data 15, the road gradient information of each road section represents a direction and magnitude of its road gradient. The direction of the road gradient indicates one having a large height in a start position and a finish position of each road section. The magnitude of the road gradient indicates a value obtained by dividing a height difference between the start position and the finish position of each road section by a distance (or length) of the road section.

The magnitude of a gradient of the road section is a ratio of its rise to its run and is given as a decimal or percent. The magnitude of a gradient of a road section is its tangent ratio expressed as a percent (%).

The vehicle position detection unit 13 has a GNSS (Global Navigation Satellite System) receiver, a gyro sensor, an acceleration sensor, etc.

The GNSS receiver receive radio waves to determine their position (longitude, latitude, and altitude/elevation) to high precision (within a few meters) using time signals transmitted along a line of sight by radio from satellites. Those satellites provide autonomous geo-spatial positioning. The vehicle position detection unit 13 is used for navigation or for tracking the position of the own vehicle fitted with the GNSS receiver. That is, the GNSS receiver receives time signals, transmitted along a line of sight by radio from the satellites, through its antenna. The vehicle position detection unit 13 detects the position of the own vehicle on the basis of the received time signals.

The gyro sensor detects a magnitude of a rotational motion of the own vehicle. The acceleration sensor detects an acceleration in a forward direction of the own vehicle. The vehicle position detection unit 13 estimates the position of the own vehicle on the map data 15 on the basis of the detection results of the GNSS receiver, the gyro sensor and the acceleration sensor.

In general, because the GNSS receiver has a low detection accuracy when detecting a position of the own vehicle, it is necessary to correct the detected position of the own vehicle by using a pattern matching. The vehicle position detection unit 13 estimates a vehicle position on the road as the correct position of the own vehicle by using a traveling locus of the own vehicle obtained on the basis of the detection results transmitted from the gyro sensor and the acceleration sensor, and the road shape specified from the map data 15. However, there is a possible case of it being difficult for the conventional technique previously described to determine the correct position of the own vehicle because of generating multiple estimation results. This conventional technique provides multiple estimated positions of the own vehicle.

The communication unit 14 communicates with other devices mounted on the own vehicle through the in-vehicle LAN 40.

The in-vehicle camera 30 periodically captures front scene images in front of the own vehicle, and generates image signals regarding the captured front scene images, and transmits the image signals to the white line recognition device 20.

The image signals show the scene image of the road on which the own vehicle travels. The in-vehicle camera 30 is an in-vehicle monocular camera. The in-vehicle monocular camera has a single lens and image capturing elements. The in-vehicle monocular camera is installed at a single position on the own vehicle. It is acceptable to use a stereo camera instead of using the in-vehicle monocular camera.

The white line recognition device 20 receives the image signals transmitted from the in-vehicle camera 30, and generates front image of the front road every periods on the basis of the received image signals transmitted from the in-vehicle camera 30.

The white line recognition device 20 detects and recognizes white lane boundary lines marked on the road on the basis of the front images. It is acceptable for the white line recognition device 20 to detect various colors of traffic lines and marks. The white line recognition device 20 has a control section 21, a communication section 22, etc.

The control section 21 has a microcomputer, etc. The microcomputer is composed of a central processing unit (CPU), a read only memory (ROM), a random access memory (RAM), an input/output interface (I/O interface), etc. The control section 21 obtains programs stored in the ROM and the RAM, and executes the programs to control the operation of each of the communication section 22, etc.

The RAM and ROM in the control section 21 correspond to non-transitory memory mediums capable of storing the programs.

The control section 21 executes the programs stored in the ROM and the RAM so as to realize various functions of cruise assist for the own vehicle. It is acceptable to use logical circuits and analogue circuits to realize the various processes executed by the control section 21.

The communication section 22 communicates with other devices and mounted on the own vehicle through the in-vehicle LAN 40.
(Processes)
(Summary)

The white line recognition device 20 in the in-vehicle system 1 detects a curvature of the road (or the road curvature) on the basis of the front images generated on the basis of the received image signals transmitted from the in-vehicle camera 30.

The white line recognition device 20 performs various types of cruise assist for the own vehicle on the basis of the obtained road curvature. Specifically, the white line recognition device 20 detects a road shape, a yaw angle of the own vehicle, a lateral position of the own vehicle on the drive lane of the road on which the own vehicle runs, etc. on the basis of the detected road curvature.

It is acceptable for the white line recognition device 20 to detect whether or not a lane departure of the own vehicle occurs on the basis of the detection results regarding the road shape, the yaw angle of the own vehicle, the lateral position of the own vehicle, etc.

It is acceptable for the white line recognition device 20 to perform other types of cruise assist for the own vehicle on the basis of the detected road curvature. Further, it is possible for the white line recognition device 20 to provide the detected road curvature to other devices mounted on the own vehicle through the in-vehicle LAN 40. In the latter case, it is possible for another device to perform cruise assist for the own vehicle the basis of the received road curvature transmitted form the white line recognition device 20.

The white line recognition device 20 receives image signals at a periodic timing transmitted form the in-vehicle camera 30. The white line recognition device 20 generates the front images on the basis of the received image signals, and extracts edge points from the front images. The white line recognition device 20 further extracts edges of the lane boundary line on the basis of the extracted edge points.

For example, one or more edge points belong to an edge point area. That is, the edge point area is composed of one or more edge points. The color of each edge point in the edge point area is different from the color of a surrounding area of the lane boundary line by more than a predetermined threshold. In other words, the edge point area includes one or more edge points, each of which has a color parameter (for example, a brightness value) which is higher than that of its surrounding point.

The white line recognition device 20 converts the front image to a birds-eye image, and detects a curvature of a lane boundary line along the front road in the birds-eye image. It is considered that the curvature of the lane boundary line corresponds to a curvature of the road in front of the own vehicle.

The white line recognition device 20 calculates a curvature of the road in front of the own vehicle on the basis of the detection results of the curvature of the lane boundary line extracted from the front images which have been sequentially captured. For example, it is possible for the white line recognition device 20 to calculate a weight average of the curvature of the lane boundary line as the road curvature (the curvature of the road) in front of the own vehicle.

(2) Calculation of Curvature of Lane Boundary Line

When lane boundary lines are detected in the front image, which run along the front road at both sides of the own vehicle, it is possible to detect a direction and magnitude of a gradient of the front road on the basis of the shape of the lane boundary line. In this case, it is possible to calculate a curvature of the lane boundary line on the basis of the detection results of the direction and magnitude of the gradient of the front road. This calculation can suppress influence caused by the gradient of the front road.

Hereinafter, a gradient direction of the front road is determined on the basis of the position of the own vehicle.

That is, an uphill road has an uphill gradient, and a downhill of a road has a downhill gradient.

There is another possible case in which one lane boundary line is detected in a front image. This causes a difficulty whether the lane boundary line in the front image has curved by influence of the road gradient or by the curvature of the front road. Accordingly, there is a possible case of it becoming difficult to correctly calculate a curvature of the front road when the front road has a road gradient.

On the other hand, in the in-vehicle system 1 as the road curvature detection device according to the exemplary embodiment, the white line recognition device 20 calculates a curvature of a lane boundary line on the basis of edge points extracted from the front images, and a gradient information of a traveling section on the road, on which the own vehicle travels, stored in the map data 15. The traveling section on the road extends from the current position of the own vehicle in a forward direction of the own vehicle. In other words, the traveling section is measured from the start point as the current position of the own vehicle to a front point to which the own vehicle travels. It is possible to specify the current road section on the basis of the map data 15, the position of the own vehicle, and a traveling direction of the own vehicle.

A current road section on the road, a gradient of which is not less than a predetermined gradient value, is also referred to as the "gradient section". On the other hand, a current road section on the road, a gradient of which is less than the predetermined gradient value, is also referred to as a "flat section".

The white line recognition device 20 calculates a curvature of the current road section on the road by using a special detection method when the current road section is the gradient section. The special detection method calculates a curvature of a current road section by using a gradient obtained from the gradient information of the current road section. That is, the special detection method calculates the curvature of the current road section while suppressing influence of the gradient indicated by the gradient information. For example, the white line recognition device 20 uses three special detection methods, i.e. a first special detection method, a second special detection method and a third special detection method to calculate the curvature of the current road section.

The white line recognition device 20 uses the first special detection method when the front road has a current road section having a gradient which is equal to the gradient indicated by the gradient information of the current road section.

The white line recognition device 20 corrects a position of an edge point in the front image on the basis of the gradient information of the current road section. That is, this edge point is corrected, i.e. moved according to a magnitude and direction of the gradient indicated by the gradient information.

The larger the gradient, the longer a movement distance of the edge point is. This makes it possible to correct (or moved) the edge point to a position which is present in the front image on assuming the front road has no gradient. The front road specified on the basis of the edge point which has been moved becomes a flat road having no gradient indicated by the gradient information. The white line recognition device 20 calculates the curvature of the current road section on the basis of multiple edge points including the edge point which has been corrected, i.e. moved by the first special detection method.

Figure 2:
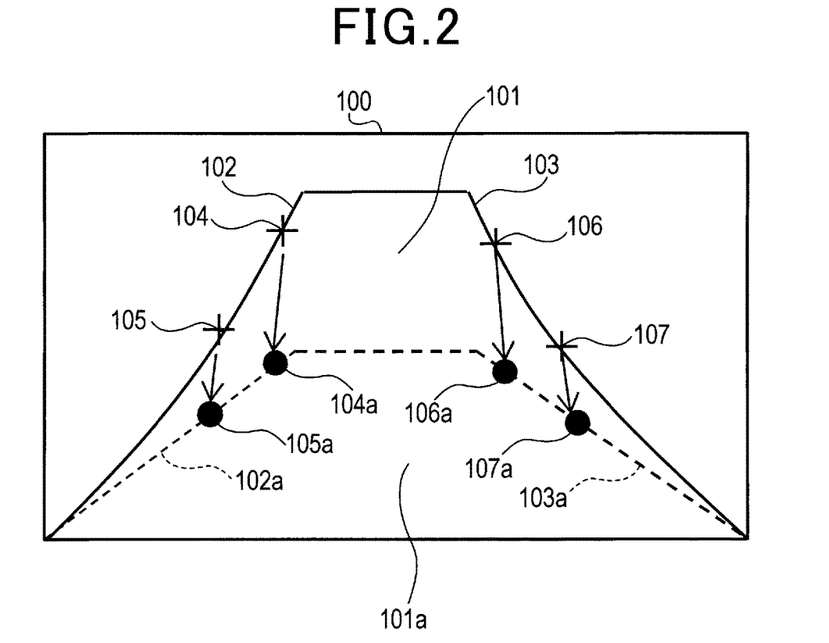
FIG. 2 is a view explaining a correction of a front image 100 generated by a first special detection method which is performed by a white line recognition device 20 in the in-vehicle system 1 as the road curvature detection device according to the exemplary embodiment shown in FIG. 1.

A description will now be given of detailed explanation of the first special detection method with reference to FIG. 2. FIG. 2 is a view explaining a correction of a front image 100 generated by the first special detection method. The first special detection method is performed by the white line recognition device 20 in the in-vehicle system 1 as the road curvature detection device according to the exemplary embodiment shown in FIG. 1.

In more detail, as shown in FIG. 2, the front image 100 has the front road 101 having an uphill gradient. Edge points 104 to 107 are extracted from the front image 100. An edge section 102 is extracted on the basis of the edge points 104 and 106. The extracted edge section 102 is present along the front road 101 in the front image 100. Further, an edge section 103 is extracted on the basis of the edge points 106 and 107. The extracted edge section 103 is present along the front road 101 in the front image 100.

Because the gradient of the front road 101 indicates an uphill direction, the edge points 104 to 107 are moved in a downhill direction so as to approach the own vehicle by the first special detection method. That is, the edge points 104 to 107 are moved to edge points 104*a* to 107*a* respectively, as shown in FIG. 2. The white line recognition device 20 extracts the edge section 102*a* of the current road section on the basis of the edge points 104*a* and 105*a*.

A front road 101*a* obtained on the basis of the edge sections 102*a* and 103*a* of the current road section has no gradient.

When the front road is a downhill road, i.e. has a downhill gradient, edge points of the edge section of the lane boundary line along the front road are moved upward in the direction to be away from the own vehicle. This movement makes it possible to allow the front road to have no gradient.

Figure 3:
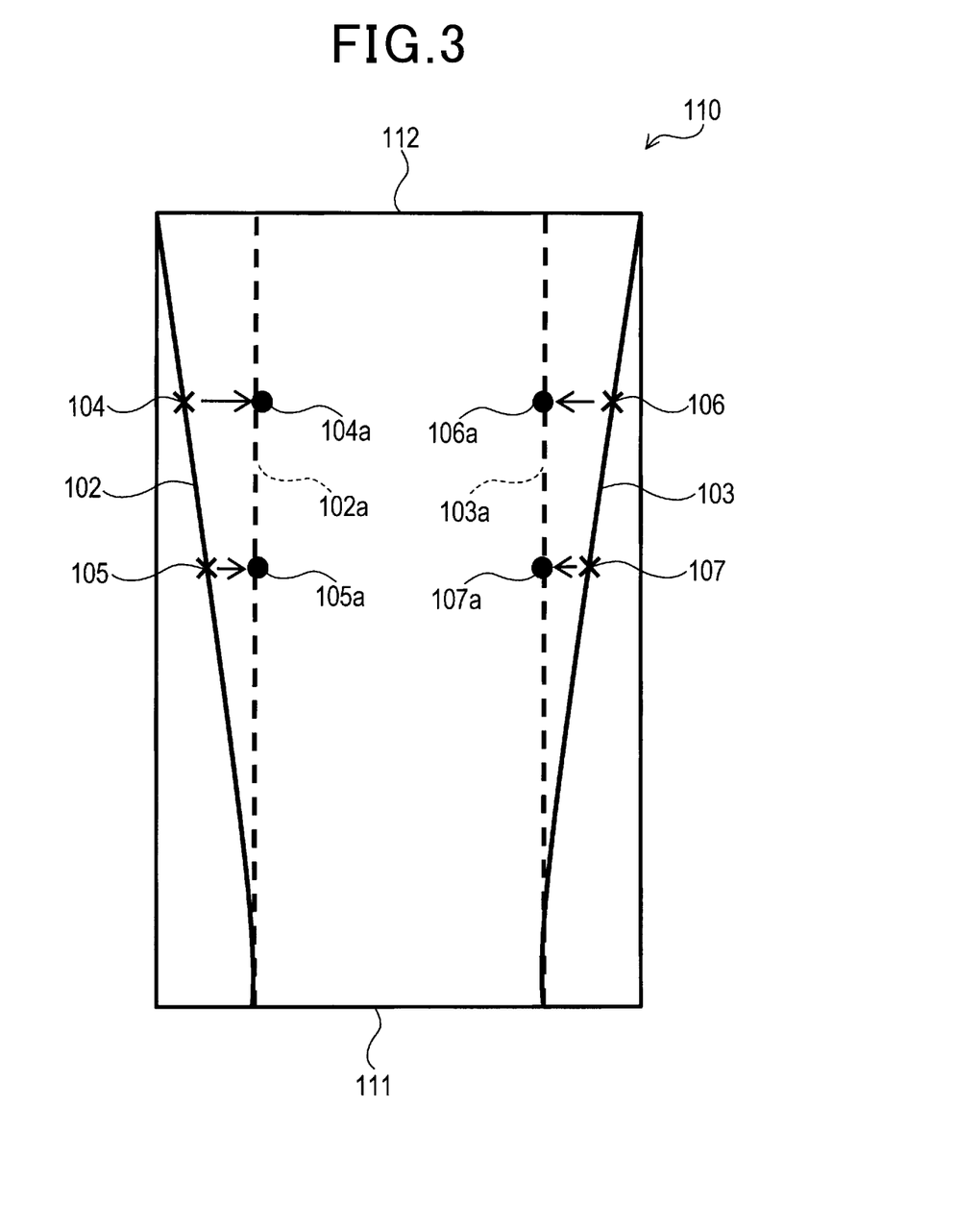
FIG. 3 is a view explaining a correction of a birds-eye image 110 generated from the front image 100 shown in FIG. 2 by the first special detection method.

FIG. 3 is a view explaining a correction of a birds-eye image 110 generated from the front image 100 shown in FIG. 2 by the first special detection method. As previously described, the first special detection method is performed by the white line recognition device 20 in the in-vehicle system 1 as the road curvature detection device according to the exemplary embodiment shown in FIG. 1.

In the birds-eye image 110 shown in FIG. 3, the own vehicle is present at a bottom side 111. FIG. 3 shows the edge points 104 to 107 before the correction performed by the first special detection method. Further, FIG. 3 also shows the edge points 104 to 107*a* after the correction performed by the first special detection method. The edge sections 102, 103 of the lane boundary lines extracted on the basis of the edge points 104 to 107 before the correction from the front image 100 expands toward an upper side 112. That is, a width between the edge sections 102 and 103 gradually expands upward. This means that the front road has an uphill road.

On the other hand, the edge sections 102*a*, 103*a* of the lane boundary lines extracted on the basis of the edge points 104*a* to 107*a* after the correction from the front image 100 extends approximately parallel to each other. That is, as shown in FIG. 3, the front road specified by the edge sections 102*a* and 103*a* after the correction has no gradient.

It is acceptable for the first special detection method to correct the position of each edge point in the birds-eye image 110 instead of using the front image 100. That is, it is acceptable to correct, i.e. move the edge points in the birds-eye image 110 to positions which correspond to the magnitude and direction of the gradient indicated by the gradient information. Further, it is possible to recognize that the front road on the basis of the moved edge points has no gradient.

The second special detection method performs a correction to move, i.e. correct a vanishing point, located at a center of the front image, upward or downward. Specifically, the second special detection method recognizes that the front road has a gradient indicated by the gradient information of the current road section. When the gradient information represents an uphill gradient, the second special detection method converts the front image so as to move the vanishing point upward.

On the other hand, when the gradient information represents a downhill gradient, the second special detection method converts the front image so as to move the vanishing point downward. The white line recognition device 20 calculates a curvature of the edge section of the lane boundary line along the front road in the front image after the correction.

Figure 4:
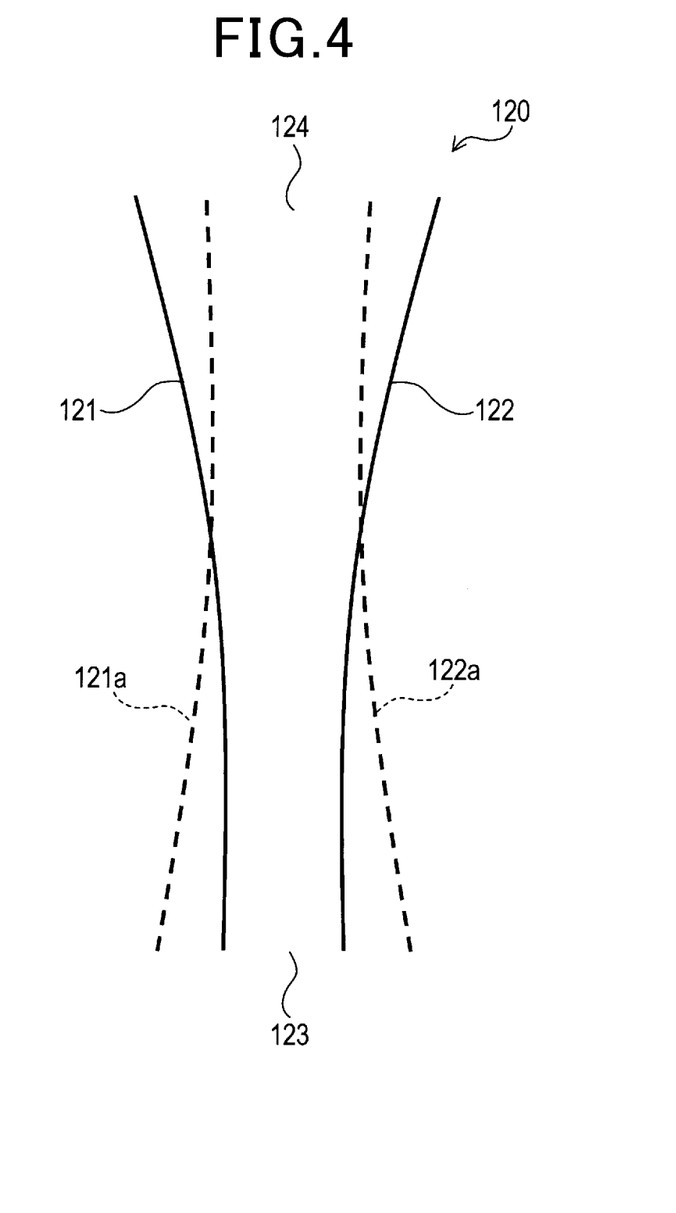
FIG. 4 is a view explaining a correction of the front image by a second special detection method performed by the white line recognition device 20 in the in-vehicle system 1 as the road curvature detection device according to the exemplary embodiment shown in FIG. 1.

FIG. 4 is a view explaining a correction of a birds-eye image 120 generated from the front image 100 shown in FIG. 2 by the second special detection method. As previously described, the second special detection method is performed by the white line recognition device in the in-vehicle system as the road curvature detection device according to the exemplary embodiment shown in FIG. 1.

The birds-eye image 120 shown in FIG. 4 is generated from the front image in which the front road is a straight road having an uphill gradient. In the birds-eye image 120, the own vehicle is present at a bottom side 123. Lane boundary lines run along the front road at both sides of the own vehicle. The edge sections 121 and 122 of the lane boundary lines are extracted from the front image before the correction performed by the second special detection method in FIG. 4.

As shown in FIG. 4, a width between the edge sections 121 and 122 of the lane boundary lines expands toward the upper side 124.

On the other hand, the edge sections 121*a* and 122*a* of the lane boundary lines are extracted from the front image after the correction. The width between the edge sections 121*a* and 122*a* of the lane boundary lines narrows toward the upper side 124 in FIG. 4.

A section of the front road at the upper side 124 (hereinafter, referred to as the "upper side section") has approximately a straight-line shape. That is, the second special detection method suppresses influence of the gradient on sections which are further from the position of the own vehicle.

The white line recognition device 20 calculates a curvature of the lane boundary line on the basis of the edge points 121*a* and 122*a* of the lane boundary lines. Use of the second special detection method increases the accuracy of detecting the lane boundary lines.

As previously explained, the second special detection method moves the vanishing point in the front image so as to approach the shape of the upper side section (in the edge section of the lane boundary lines) to a straight line in a forward direction of the own vehicle. The movement distance of the vanishing point is determined on the basis of a magnitude of the gradient indicated by the gradient information. Specifically, the more the gradient increases, the more the movement distance of the vanishing point increases.

The third special detection method detects a curvature of the lane boundary line on the current road section within a narrow detection range when compared with a detection range of a curvature of the lane boundary line on a flat current road section.

That is, when the current road section is flat (i.e. a flat current road section), the white line recognition device 20 uses a usual detection distance X (for example, X is approximately 50 meters) on the front road measured from the position of the own vehicle. The white line recognition device 20 calculates a curvature of the lane boundary line within the usual detection distance X.

On the other hand, when the white line recognition device 20 uses the third special detection method, the third special detection method uses a special detection range Y on the front road measured from the position of the own vehicle. The special detection distance Y is shorter than the usual detection distance X (Y<X). It is acceptable for the special detection distance Y to be approximately 15 meters (Y=15 meters). It is possible to reduce the special detection distance Y according to increasing of the gradient of the current road section.

As shown in the bird's-eye image 120 shown in FIG. 4, the edge sections 121 and 122 of the lane boundary lines along the front road having an uphill gradient are curved outward when being away from the own vehicle. On the other hand, the edge sections 121 and 122 of the lane boundary lines along the front road having a downhill gradient are curved inward away from the own vehicle.

However, the edge section of the lane boundary line becomes approximately a straight-line shape at a position close to the own vehicle. That is, at the position close to the own vehicle, only a small influence occurs at a position close to the own vehicle. For this reason, the use of a reduced detection distance allows a curvature of the lane boundary line to be correctly calculated while suppressing influence of the gradient. This operation makes it possible to increase the accuracy of detecting the lane boundary line.

When the current road section is a gradient section, the white line recognition device 20 in the in-vehicle system 1 as the road curvature detection device according to the exemplary embodiment shown in FIG. 1 selects and uses one from the first to third special detection methods.

The judgment method of detecting the accuracy of the gradient information will be explained later. The white line recognition device 20 calculates a curvature of the lane boundary line by using the selected special detection method.

(3) Curvature Detection Process

A description will now be given of the curvature detection process of calculating a curvature of a lane boundary line in the front road with reference to FIG. 5.

Figure 5:
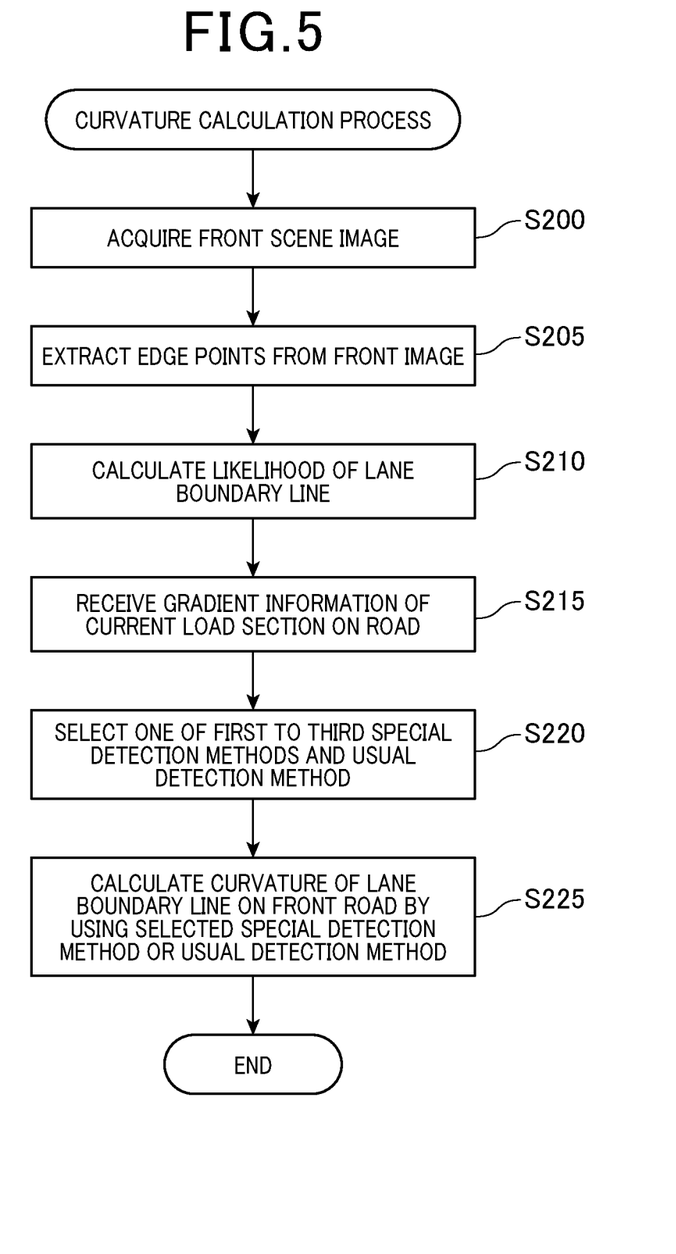
FIG. 5 is a view showing a flow chart of a curvature detection process performed by the white line recognition device 20 in the in-vehicle system 1 as the road curvature detection device according to the exemplary embodiment shown in FIG. 1.

FIG. 5 is a view showing a flow chart of the curvature detection process performed by the white line recognition device 20 in the in-vehicle system 1 as the road curvature detection device according to the exemplary embodiment shown in FIG. 1.

The white line recognition device 20 periodically performs the curvature detection process shown in FIG. 5.

In step S200, the control section 21 in the white line recognition device 20 receives a front image transmitted from the in-vehicle camera 30. The operation flow progress to step S205.

In step S205, the control section 21 extracts edge points from the front image. Specifically, it is acceptable for the control section 21 to extract the edge points by using the Canny method or the differential edge detection method. The operation flow progress to step S210.

In step S210, the control section 21 in the white line recognition device 20 extracts candidates of a lane boundary line on the basis of the extracted edge points. The control section 21 calculates a likelihood of each lane boundary line candidate. It is acceptable to calculate the likelihood of each lane boundary line candidate on the basis of:

a contrast between a lane boundary line candidate and an area surrounding the lane boundary line candidate;

a pattern or average luminance of the lane boundary line candidate; and/or the number of edge points on the lane boundary line candidate.

The control section 21 determines the lane boundary line candidate to be a lane boundary line when the lane boundary line candidate reaches a predetermined likelihood threshold value. The control section 21 specifies a lane boundary line which extends in the forward direction of the own vehicle as a calculation target for calculating a curvature of the lane boundary line. The operation flow progress to step S215.

In step S215, the control unit 11 in the navigation device 10 specifies a current road section which including the position of the own vehicle in the map data 15, and reads the gradient information of the specified current road section from the map data 15.

At this time, the control unit 11 specifies a gradient accuracy of the obtained gradient information for the specified current road section. In other words, the control unit 11 detects a density of the gradient information for the specified current road section obtained from the map data 15. The control unit 11 determines the gradient accuracy of the gradient information for the specified current road section on the basis of the detection result. As previously described, the gradient information and the current road sections are stored in one-to-on correspondence in the map data 15. The control unit 11 calculates an average value A of lengths of the current road sections corresponding to the gradient information stored in the map data 15. When the average value A is gradually reduced, the control unit 11 recognizes that the gradient information has a high degree.

Specifically, the control unit 11 determines that the gradient accuracy of the gradient information is high when the average value A is smaller than a first predetermined value A1 (A<A1).

The control unit 11 determines that the gradient accuracy of the gradient information is medium when the first predetermined value A1 is not more than the average value A and the average value A is not more than a second predetermined value A2 (A1<=A<=A2), where The first predetermined value A1 is smaller than the second predetermined value A2 (A1<A2).

The control unit 11 determines that the gradient accuracy of the gradient information is low when the second predetermined value A2 is smaller than the average value A (A2<A).

The control unit 11 in the navigation device 10 generates information which represents the gradient accuracy of the gradient information.

For example, it is possible to use the first predetermined value A1 of 12.5 meters and the second predetermined value A2 of 17.5 meters (A1=12.5 meters, and A2=17.5 meters). It is acceptable for the control unit 11 to change the first predetermined value A1 and the second predetermined value A2 according to a level of the gradient accuracy of the detected current road sections. Specifically, when the degree of variation of the gradient is large, it is acceptable for the control unit 11 to reduce the first predetermined value A1 and the second predetermined value A2. On the other hand, when the degree of variation of the gradient is small, it is acceptable for the control unit 11 to increase the first predetermined value A1 and the second predetermined value A2.

The control unit 11 in the navigation device 10 transmits the gradient information and the generated gradient degree information to the white line recognition device 20 through the in-vehicle LAN 40. When multiple positions of the own vehicle are estimated, the control unit 11 reads the gradient information of the current road sections, each of which contains each of the positions of the own vehicle, from the map data 15.

The control unit 11 generates the information of the gradient accuracy of each gradient information by the calculation method previously described. The control unit 11 in the navigation device 10 transmits all of the gradient information and the information of the gradient accuracy to the white line recognition device 20 through the in-vehicle LAN 40.

On the other hand, the control section 21 in the white line recognition device 20 receives the gradient information and the information of the gradient accuracy transmitted from the control unit 11 in the navigation device 10. The operation flow progresses to step S220.

In step S220, the control section 21 in the white line recognition device 20 selects the appropriate detection method for calculating a curvature of the lane boundary line in the front image.

When the gradient information obtained in step S215 indicates that the current road section is a flat section, the control section 21 selects a usual detection method. The usual detection method does not suppress a gradient indicated by the gradient information, and calculates the curvature of the current road section.

When only one gradient information is obtained in step S215 and the obtained gradient information indicates that the current road section has a gradient, the control section 21 in the white line recognition device 20 selects a method from the first special detection method, the second special detection method and the third special detection method on the basis of the gradient accuracy of the gradient information indicated by the information of the gradient accuracy. Specifically, when the gradient accuracy of the gradient information is high (when A<A1), the control section 21 selects the first special detection method.

On the other hand, when the gradient accuracy of the gradient information is medium (when A1<=A<=A2), the control section 21 selects the second special detection method. Further, when the gradient accuracy of the gradient information is low (when A2<A), the control section 21 selects the third special detection method.

When multiple items of gradient information are received in step S215, it is acceptable for the control section 21 to select the usual detection method. In this case, it is also acceptable for the control section 21 to select the third special detection method.

Still further, when multiple items of gradient information are received in step S215 and the received gradient information contain different gradient information representing opposite gradient directions, it is acceptable for the control section 21 to select the usual detection method. In this case, it is also acceptable for the control section 21 to select the third special detection method.

On the other hand, when the multiple items of gradient information represent the same gradient direction only, the control section 21 selects the gradient information having a minimum gradient as a target gradient information to be used. At this time, the control section 21 judges whether the current road section is a flat section or a gradient section on the basis of the target gradient information.

When the current road section is a flat section, it is acceptable for the control section 21 to select the usual detection method. On the other hand, when the current road section is the gradient section, it is acceptable for the control section 21 to select one from the first special detection method, the second special detection method and the third special detection method on the basis of the gradient accuracy of the target gradient information. In this case, the first special detection method, the second special detection method and the third special detection method use the target gradient information.

It is acceptable for the control section 21 in the white line recognition device 20 to specify one from the multiple items of gradient information as the target gradient information regardless of the gradient direction. The control section 21 selects a method from the usual detection method, the first special detection method, the second special detection method and the third special detection method on the basis of the target gradient information. In this case, each of the first special detection method, the second special detection method and the third special detection method uses the target gradient information. The operation flow progresses to step S225.

In step S225, the control section 21 calculates a curvature of the lane boundary line in the front image on the basis of the detection method (one selected from the usual detection method, the first detection method, the second special detection method and the third special detection method) selected in step S220.

When the usual detection method is selected in step S220, the front image from which the lane boundary line has been extracted is converted to a birds-eye image. The control section 21 performs a model-fitting of the edge sections of the lane boundary line within a usual detection range in the converted birds-eye image. That is, the control section 21 performs the least squares method to select an edge section, which has been stored in advance. The selected edge section has the highest similarity to the edge section of the lane boundary line extracted on the basis of the edge points. The control section 21 uses a curvature of a curve of the selected edge section as the curvature of the lane boundary line.

When the first special detection method is selected in step S220, the control section 21 corrects the edge points in the front image, from which the lane boundary line has been extracted, by using the first special detection method. The front image after the correction is converted to a birds-eye image. The control section 21 performs the model-fitting of the edge sections of the lane boundary line within the usual detection range in the converted birds-eye image, and selects an edge section from the curves which have been stored in advance so that the selected edge section has the highest similarity to the edge section of the lane boundary line extracted on the basis of the edge points. The control section 21 uses a curvature of a curve of the selected edge section as the curvature of the lane boundary line.

When the second special detection method is selected in step S220, the control section 21 corrects the vanishing point in the front image, from which the lane boundary line has been extracted, by using the second special detection method. The front image after the correction is converted to a birds-eye image. The control section 21 performs the model-fitting of the edge sections of the lane boundary line within the usual detection range in the converted birds-eye image, and selects an edge section from the curve data which have been stored in advance so that the selected edge section has the highest similarity to the edge section of the lane boundary line extracted on the basis of the edge points. The control section 21 uses a curvature of a curve of the selected edge section as the curvature of the lane boundary line.

On the other hand, when the third special detection method is selected in step S220, The front image is converted to a birds-eye image. The control section 21 performs the model-fitting of the edge sections of the lane boundary line within the usual detection range in the converted birds-eye image, and selects an edge section from the curve data which have been stored in advance so that the selected edge section has the highest similarity to the edge section of the lane boundary line extracted on the basis of the edge points. The control section 21 uses a curvature of a curve of the selected edge section as the curvature of the lane boundary line.

The control unit 21 in the white line recognition device 20 calculates the curvature of the road on the basis of the calculate curvature of the lane boundary line. It is acceptable for the control section 21 to calculate a curvature of the lane boundary line while using the gradient information when the edge section of the lane boundary line at a right side or left side only of the own vehicle along the front road is extracted.

It is also acceptable for the control section 21 to calculate a curvature of each lane boundary line without using gradient information by using the usual detection method when the edge sections of the lane boundary lines at both sides of the own vehicle are extracted along the front road. In this case, it is possible to calculate the curvature of the front road on the basis of the shape of the edge sections of these lane boundary lines. Further, it is also acceptable for the control section 21 to correct the curvature of the lane boundary lines on the basis of the gradient of the front road.

(Modifications)

A description will be given of a modification of the white line recognition device 20 according to the exemplary embodiment.

A difference between the modification and the exemplary embodiment previously described will be explained. The same reference numbers and characters indicate the same components between the exemplary embodiment and the following modification. The modification has steps which are different from the step S215, step S220 and step S225 in the exemplary embodiment previously described.

In step S215, the control unit 11 in the navigation device 10 reads the gradient information of the current road section, which includes the position of the own vehicle, from the map data 15 on the basis of an instruction transmitted from the in the white line recognition device 20. Further, the control unit 11 reads current road section information from the map data 15, the current road section information represents a shape of the current road section. That is, the current road section information shows a curvature of the current road section.

When a current road section is a curve, the current road section information shows a direction of the curve (hereinafter, referred to as the "curve direction"). The control unit 11 in the navigation device 10 generates the gradient accuracy of the gradient information, like the calculation previously explained in the exemplary embodiment.

When multiple positions of the own vehicle are estimated, the control unit 11 generates the gradient information, the current road section information and the gradient accuracy of the gradient information corresponding to each of the multiple positions of the own vehicle.

The control unit 11 transmits to the white line recognition device 20 the generated gradient information, the generated current road section information and the generated gradient accuracy of the gradient information. The control section 21 in the white line recognition device 20 receives the gradient information, the generated current road section information and the generated gradient accuracy of the gradient information transmitted from the navigation device 10.

In step S220, and step S225, the control section 21 in the white line recognition device 20 calculates a curvature of the lane boundary line in the front image on the basis of one selected from multiple positions of the own vehicle which have been estimated by the control unit 11 in the navigation device 10.

In step S220, the control section 21 determines or selects the detection method for calculating a curvature of the lane boundary line corresponding to one position or each of the multiple positions of the own vehicle.

For example, when the gradient information indicates that the current road section is a flat section, the control section 21 selects the usual detection method corresponding to the position of the own vehicle and the current road section including the position of the own vehicle.

On the other hand, when the gradient information indicates that the current road section has a gradient section, the control section 21 selects a method from the first detection method, the second detection method, and the third detection method on the basis of the current road section which includes the position of the own vehicle. That is, the control section 21 selects a method from the first detection method, the second detection method, and the third detection method on the basis of the gradient accuracy of the gradient information, like the processes in the exemplary embodiment previously explained.

In step S225, the control section 21 calculates a curvature of the lane boundary line in the front image corresponding to each of the multiple positions of the own vehicle. Specifically, the control section 21 calculates the curvature of the lane boundary line by using the detection method which corresponds to each of the positions of the own vehicle, like the same steps in the exemplary embodiment previously explained. In this case, the control section 21 specifies, as the curve direction of the front road, a curve direction of the lane boundary line.

The control section 21 in the white line recognition device 20 compares the curvature of the lane boundary line and the curve direction for each of the positions of the own vehicle with the curvature of the current road section and the curve direction of the current road section which includes the position of the own vehicle in the map data 15. The curvature of the current road section and the curve direction of the current road section are specified by the current road section information.

The control section 21 detects whether or not the curve direction of the lane boundary line coincides with the curve direction of the current road section. The control section 21 uses the calculated curvature of the lane boundary line, which has the minimum difference between them and the same curve direction, as the curvature of the lane boundary line in the front road in the front image.

Similar to the processes explained in the exemplary embodiment previously described, the control unit 21 in the white line recognition device 20 calculates the curvature of the road on the basis of the calculate curvature of the lane boundary line. It is acceptable for the control section 21 to calculate a curvature of the lane boundary line while using the gradient information when the edge section of the lane boundary line at a right side or left side only of the own vehicle along the front road is extracted.

It is also acceptable for the control section 21 to calculate a curvature of each lane boundary line without using gradient information by using the usual detection method when the edge sections of the lane boundary lines at both sides of the own vehicle are extracted along the front road. In this case, it is possible to calculate the curvature of the front road on the basis of the shape of the edge sections of these lane boundary lines. Further, it is also acceptable for the control section 21 to correct the curvature of the lane boundary lines on the basis of the gradient of the front road.

(Effects)

A description will now be given of the effects of the in-vehicle system 1 as the road curvature detection device according to the exemplary embodiment.

(1) When the current road section of the own vehicle specified in the map data 15 is a gradient section, the curvature calculation process calculates a curvature of the lane boundary line on the front road by using a method in the first special detection method, the second special detection method and the third special detection method. The gradient of the current road section is specified on the basis of the gradient information in the map data 15. When the gradient accuracy of the gradient information for the current road section is low, the curvature of the current road section calculated by a method of the first to third special detection methods may have an error which becomes larger than an error of the curvature calculated by the usual detection method.

In particular, the first special detection method provides a large effect for suppressing influence from the gradient. However, the first special detection method causes a large error when the gradient accuracy of the gradient information is low (when A2<A).

Similar to the first special detection method, when the gradient accuracy of the gradient information is low, there is another possible case in which the curvature of the current road section calculated by the second special detection methods has an error which becomes larger than an error of the curvature calculated by the usual detection method.

On the other hand, in the curvature calculation process, the control section 21 selects the first special detection method when the gradient accuracy of the gradient information is high (when A<A1). Further, the control section 21 selects the second special detection method when the gradient accuracy of the gradient information is medium (when A1<=A<=A2). Furthermore, the control section 21 selects the third special detection method when the gradient accuracy of the gradient information is low (when A2<A). This makes it possible to avoid an incorrect result having an error, generated due to a low gradient accuracy of the gradient information, which becomes larger than an error generated by the use of the usual detection method. It is therefore possible for the in-vehicle system 1 as the road curvature detection device to detect the curvature of the road with high accuracy.

(2) The first special detection method performs the correction process of moving the edge points in the front image according to the gradient indicated by the gradient information of the current road section. In this correction process performed by the first special detection method, the edge points are moved to edge positions assuming the front road has no gradient. The curvature of the current road section in the front road is calculated on the basis of the corrected edge points, i.e. the moved edge points. This makes it possible to calculate the curvature of the lane boundary line on the front road when the current road section on the front road has a gradient.

(3) In a case in which the front road is an uphill road and the control section incorrectly recognizes that the front road is a downhill, when the special detection method calculates a curvature of the lane boundary line on the basis of the error detection, the calculated curvature has a large error.

On the other hand, the curvature detection process performed by the in-vehicle system 1 as the road curvature detection device according to the exemplary embodiment selects the usual detection method when simultaneously estimating multiple positions of the own vehicle, i.e. one position of the own vehicle in the current road section has an uphill gradient and another position of the own vehicle in the current road section has a downhill gradient. This makes it possible to avoid a method in the first to third special detection methods from being selected and used under incorrect recognition of the gradient direction of the front road.

(4) In a case in which the front road is a flat road and the control section incorrectly recognize that the front road has a large gradient, when a curvature of the lane boundary line is calculated by using the special detection method, the calculated curvature has a large error when compared with an error caused by using the usual detection method.

On the other hand, the curvature detection process performed by the in-vehicle system 1 as the road curvature detection device according to the exemplary embodiment calculates the curvature of the front road by using the usual detection method when multiple positions of the own vehicle are estimated. This makes it possible to avoid incorrect recognition that the front road has a large gradient when the front road is a flat road, and to avoid a method in the first to third special detection methods from being selected.

(5) In a case in which the front road is a flat road or has a small gradient, and the control section causes an incorrect recognition that the front road has a large gradient, when a curvature of the lane boundary line is calculated by using the special detection method, the calculated curvature has a large error when compared with an error caused by using the usual detection method.

On the other hand, the curvature detection process performed by the in-vehicle system 1 as the road curvature detection device according to the exemplary embodiment specifies and selects, as the target gradient information, one item of gradient information having the smallest gradient from the gradient information of the multiple positions of the own vehicle when multiple positions of the own vehicle are estimated. The curvature detection process performed by the in-vehicle system 1 as the road curvature detection device according to the exemplary embodiment calculates the curvature of the lane boundary line on the basis of the target gradient information by using the special detection method. This makes it possible to avoid a case in which the curvature of the front road calculated by the special detection method has an error which is larger than an error calculated by using the usual detection method.

(6) The curvature detection method according to the modification of the exemplary embodiment previously described calculates the curvature of the lane boundary line on the front road and the curve direction of the lane boundary line which correspond to each of the estimated positions of the own vehicle. Specifically, the curvature detection method according to the modification calculates the curvature corresponding to each of the estimated positions of the own vehicle on the basis of a special detection method which corresponds to the gradient information and the gradient accuracy of the gradient information of the current road section which includes the position of the own vehicle. The calculation results corresponding to each of the positions of the own vehicle are compared with the curvature and curve direction stored in the map data 15. The detection result more close to the curvature and curve direction stored in the map data 15 are selected and used as the curvature of the lane boundary line on the front road. This makes it possible to avoid incorrect recognition and calculation of the curvature of the lane boundary line on the basis of the incorrect gradient information.

(Other Modifications)

The subject matter of the present invention is not limited by the exemplary embodiment previously described. For example, it is possible for the present invention to provide various modifications.

(M1) As previously described, the in-vehicle system 1 as the road curvature detection device according to the exemplary embodiment uses the high degree, the medium degree and the low degree indicated by the information of the gradient accuracy of the gradient information of the current road section. The control section 21 in the white line recognition device 20 in the in-vehicle system 1 selects a method from the first special detection method, the second special detection method and the third special detection method on the basis of the gradient accuracy of the gradient information. The control section 21 performs the selected special detection method for calculating the curvature of the lane boundary line in the front image.

However, the concept of the present invention is not limited by this. It is acceptable to use another detection method of calculating the curvature of the lane boundary line while suppressing the influence of the gradient of the front road. Further, it is acceptable for the control section 21 to use two levels of accuracy of the gradient information or four or more levels of accuracy of the gradient information. It is acceptable for the control section 21 to use two or not less than four special detection methods instead of using the first to fourth special detection methods. When the current road section has a gradient, i.e. is an uphill gradient or downhill gradient, it is possible for the control section 21 to select one of two or not less than four special detection methods according to the gradient accuracy of the gradient information. Still further, when the control section 21 uses two special detection methods, it is sufficient to use two in the first to third special detection methods according to the gradient accuracy of the gradient information which corresponds to the current road section.

(M2) As previously described in detail, the white line recognition device 20 in the in-vehicle system 1 according to the exemplary embodiment calculates a curvature of the lane boundary line on the front road in the front image. The white line recognition device 20 treats that the calculated curvature of the lane boundary line corresponds to the curvature of the front road. That is, the white line recognition device 20 calculates the curvature of the front road on the basis of the curvature of the lane boundary line. However, the subject matter of the present invention is not limited by this. It is acceptable for the white line recognition device 20 to calculate a curvature of each edge section of the front road in the front image instead of calculating the curvature of the lane boundary line. It is sufficient for the white line recognition device 20 to calculate the curvature of the front road on the basis of this calculated curvature.

(M3) It is acceptable to combine the functions of the components such as the navigation device 10 and the white line recognition device 20 in the in-vehicle system 2, and to realize the combined function by using one component or a plurality of other components. It is also acceptable to eliminate a part of the components which form the in-vehicle system 2 to meet various demand from the cruise assist for the own vehicle.

(M4) The subject matter of the present invention can be realized by using various embodiments. For example, it is possible to use programs stored in a memory unit and executed by a computer system. The computer system is composed of a microcomputer, a memory unit and an interface section, etc. In general, such a microcomputer is composed of a central processing unit (CPU), a read only memory (ROM), a random access memory (RAM), an input/output interface (I/O interface), etc. It is possible to use non-transitory memory mediums capable of storing the programs, for example, a semiconductor memory, etc.

The in-vehicle system 1 according to the exemplary embodiment corresponds to the road curvature detection device, the vehicle position detection unit 13 in the navigation device 10 corresponds to an estimation section.

The process in step S200 in the curvature detection process corresponds to the image acquiring section, the process in step S215 corresponds to the information acquiring section and the accuracy detection section. The process in step S220 corresponds to the gradient judgment section and the gradient information specifying section. The process in step S225 corresponds to the comparison section. The processes in steps S205, S210, S220 and S225 correspond to the calculation section.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A road curvature detection device to be mounted on an own vehicle, comprising a computer system including a central processing unit, the computer system being configured to provide:
    an image acquiring section which acquires a front scene image of a front road in front of the own vehicle;
    an estimation section which estimates a position of the own vehicle on the basis of map data;
    an information acquiring section which acquires gradient information of a current road section in the front road including a current position of the own vehicle from the map data, the gradient information including a magnitude of a gradient and direction of the current road section, the front road extending from the position of the own vehicle in a forward direction of the own vehicle;
    an accuracy detection section which detects a gradient accuracy of the gradient information;
    a gradient judgment section which judges whether or not a magnitude of the gradient indicated by the gradient information is not less than a predetermined gradient threshold value; and
    a calculation section which extracts edge points from a front image corresponding to the captured front scene image when a color of each of the extracted edge points is different from the color of its surrounding area by more than a predetermined threshold, and calculates a curvature of the front road on the basis of the extracted edge points, and the calculation section selecting a special detection method from between a plurality of special detection methods when the gradient judgment section judges that the magnitude of the gradient is not less than the predetermined gradient threshold value, and executing the selected special detection method so as to calculate the curvature of the front road while suppressing influence of the gradient indicated by the gradient information.

2. The road curvature detection device according to claim 1, wherein the calculation section uses the selected special detection method capable of correcting a position of each of the edge points to a position which is determined on the basis of the gradient information, and calculating the curvature of the front road on the basis of the moved edge points.

3. The road curvature detection device according to claim 1, wherein the calculation section further selects a usual detection method capable of calculating the curvature of the front road without suppressing the influence of the gradient indicated by the gradient information, and
    when the estimation section estimates multiple positions of the own vehicle, and when the multiple items of gradient information of the current road section including the estimated multiple positions of the own vehicle have a different gradient direction to each other, the calculation section selects the usual detection method and calculates the curvature of the front road by using the selected usual detection method.

4. The road curvature detection device according to claim 2, wherein the calculation section further selects a usual detection method capable of calculating the curvature of the front road without suppressing the influence of the gradient indicated by the gradient information, and
    when the estimation section estimates multiple positions of the own vehicle, and when the multiple items of gradient information of the current road section including the estimated multiple positions of the own vehicle have a different gradient direction to each other, the calculation section selects the usual detection method and calculates the curvature of the front road by using the selected usual detection method.

5. The road curvature detection device according to claim 1, further comprising a gradient information specifying section which specifies as a target gradient information the gradient information having a minimum gradient from multiple items of gradient information when the estimation section estimates multiple positions of the own vehicle, wherein
    the gradient judgment section judges whether a gradient indicated by the target gradient information is not less than the predetermined gradient threshold value,
    each of the multiple special detection methods calculates a curvature of the front road by suppressing the influence of the gradient indicated by the target gradient information, and
    when the judgment result of the gradient judgment section indicates that the gradient indicated by the target gradient information is not less than the predetermined gradient threshold value, the calculation section selects a method from the special detection methods on the basis of the gradient accuracy of the target gradient information, and executes the selected special detection method to calculate the curvature of the front road.

6. The road curvature detection device according to claim 2, further comprising a gradient information specifying section which specifies as a target gradient information the gradient information having a minimum gradient from multiple items of gradient information when the estimation section estimates multiple positions of the own vehicle, wherein
    the gradient judgment section judges whether a gradient indicated by the target gradient information is not less than the predetermined gradient threshold value,
    each of the multiple special detection methods calculates a curvature of the front road by suppressing the influence of the gradient indicated by the target gradient information, and
    when the judgment result of the gradient judgment section indicates that the gradient indicated by the target gradient information is not less than the predetermined gradient threshold value, the calculation section selects a method from the special detection methods on the basis of the gradient accuracy of the target gradient information, and executes the selected special detection method to calculate the curvature of the front road.

7. The road curvature detection device according to claim 1, the calculation section further selects a usual detection method capable of calculating the curvature of the front road by suppressing the influence of the gradient indicated by the gradient information, and
    when the estimation section estimates multiple positions of the own vehicle, the calculation section selects the usual detection method and calculates the curvature of the front road by using the selected usual detection method.

8. The road curvature detection device according to claim 2, the calculation section further selects a usual detection method capable of calculating the curvature of the front road by suppressing the influence of the gradient indicated by the gradient information, and
    when the estimation section estimates multiple positions of the own vehicle, the calculation section selects the usual detection method and calculates the curvature of the front road by using the selected usual detection method.

9. The road curvature detection device according to claim 1, wherein when the estimation section estimates multiple positions of the own vehicle, the information acquiring section acquires gradient information of the current road section including each of the positions of the own vehicle from the map data,
    when the estimation section estimates the multiple positions of the own vehicle, the accuracy detection section detects a gradient accuracy of each of the multiple items of gradient information,
    when the estimation section estimates the multiple positions of the own vehicle, the gradient judgment section judges whether or not a magnitude of the gradient indicated by the gradient information of the current road section including each of the positions of the own vehicle is not less than the predetermined gradient threshold value,
    the calculation section further selects a usual detection method capable of calculating the curvature of the front road without suppressing the influence of the gradient indicated by the gradient information, and
    the calculation section calculates the curvature of the front road corresponding to each of the multiple positions of the own vehicle when the estimation section estimates the multiple positions of the own vehicle,
    wherein when the gradient judgment section judges that the magnitude of the gradient indicated by the gradient information of the current road section including each of the positions of the own vehicle is not less than the predetermined gradient threshold value, the calculation section selects a method from the special detection methods to suppress the influence of the gradient on the basis of the gradient accuracy of the gradient information, and calculates the curvature of the front road by using the selected special detection method,
    when the gradient judgment section judges that the magnitude of the gradient indicated by the gradient information of the current road section including each of the positions of the own vehicle is less than the predetermined gradient threshold value, the calculation section selects the usual detection method, and calculates the curvature of the front road by using the selected usual detection method,
    the road curvature detection device further comprises a comparison section, and
    when the estimation section estimates the multiple positions of the own vehicle, the comparison section compares the curvature of the front road, corresponding to each of the positions of the own vehicle, calculated by the calculation section with the curvature of the front road including each of the multiple positions of the own vehicle obtained from the map data, and
    the comparison section determines the curvature of the front road on the basis of the comparison result.

10. The road curvature detection device according to claim 2, wherein when the estimation section estimates multiple positions of the own vehicle, the information acquiring section acquires gradient information of the current road section including each of the positions of the own vehicle from the map data,
    when the estimation section estimates the multiple positions of the own vehicle, the accuracy detection section detects a gradient accuracy of each of the multiple items of gradient information,
    when the estimation section estimates the multiple positions of the own vehicle, the gradient judgment section judges whether or not a magnitude of the gradient indicated by the gradient information of the current road section including each of the positions of the own vehicle is not less than the predetermined gradient threshold value,
    the calculation section further selects a usual detection method capable of calculating the curvature of the front road without suppressing the influence of the gradient indicated by the gradient information, and
    the calculation section calculates the curvature of the front road corresponding to each of the multiple positions of the own vehicle when the estimation section estimates the multiple positions of the own vehicle,
    wherein when the gradient judgment section judges that the magnitude of the gradient indicated by the gradient information of the current road section including each of the positions of the own vehicle is not less than the predetermined gradient threshold value, the calculation section selects a method from the special detection methods to suppress the influence of the gradient on the basis of the gradient accuracy of the gradient information, and calculates the curvature of the front road by using the selected special detection method,
    when the gradient judgment section judges that the magnitude of the gradient indicated by the gradient information of the current road section including each of the positions of the own vehicle is less than the predetermined gradient threshold value, the calculation section selects the usual detection method, and calculates the curvature of the front road by using the selected usual detection method, the road curvature detection device further comprises a comparison section, and when the estimation section estimates the multiple positions of the own vehicle, the comparison section compares the curvature of the front road, corresponding to each of the positions of the own vehicle, calculated by the calculation section with the curvature of the front road including each of the multiple positions of the own vehicle obtained from the map data, and the comparison section determines the curvature of the front road on the basis of the comparison result.

* * * * *